United States Patent
Krishnan et al.

(10) Patent No.: US 9,338,400 B1
(45) Date of Patent: May 10, 2016

(54) SYSTEMS AND METHODS FOR USING EQUIVALENCE CLASSES TO IDENTIFY AND MANAGE PARTICIPANTS AND RESOURCES IN A CONFERENCE ROOM

(71) Applicant: Avaya Inc., Santa Clara, CA (US)

(72) Inventors: Parameshwaran Krishnan, Basking Ridge, NJ (US); Ignacio Miranda, Madrid (ES); Navjot Singh, Somerset, NJ (US)

(73) Assignee: AVAYA Inc, Santa Clara, CA (US)

( * ) Notice: Subject to any disclaimer, the term of this patent is extended or adjusted under 35 U.S.C. 154(b) by 0 days.

(21) Appl. No.: 14/462,549

(22) Filed: Aug. 18, 2014

(51) Int. Cl.
*H04N 7/15* (2006.01)

(52) U.S. Cl.
CPC .................... *H04N 7/152* (2013.01)

(58) Field of Classification Search
CPC ........................................................ H04N 7/14
USPC ............... 379/93.21, 158, 202.01; 348/14.03, 348/14.04
See application file for complete search history.

(56) References Cited

U.S. PATENT DOCUMENTS

| | | | | |
|---|---|---|---|---|
| 2007/0260684 A1* | 11/2007 | Sharma | ............... | G06Q 10/109 709/204 |
| 2012/0128140 A1* | 5/2012 | Geppert | .................. | G06F 9/543 379/93.17 |
| 2013/0263216 A1* | 10/2013 | Vakil | ....................... | G06F 21/31 726/3 |
| 2013/0294594 A1* | 11/2013 | Chervets | ................. | H04M 3/56 379/202.01 |
| 2015/0112748 A1* | 4/2015 | Kaye | ....................... | H04M 3/56 705/7.19 |

* cited by examiner

*Primary Examiner* — Olisa Anwah
(74) *Attorney, Agent, or Firm* — Brian K Dinicola; Dinicola & Young PC

(57) ABSTRACT

Equivalence classes are used to determine how groups of call participants are distributed among remotely situated conference rooms. A roster of conference call participants is distributed for display by communication devices the participants bring to a conference room. The distributed roster contains at least one indicium by which the possession of an attribute, by any conference call participant in a room can be confirmed by other conference call participant(s) using a communication device. After entering a room, at least some participants use a communication device to access the roster and indicate, to a server, that at least one other participant on the roster possesses an attribute of significance to conduct of the call. Participants are assigned to groups and the groups are merged based on the presence of participants possessing an attribute or set of linked attributes. The server assigns the participants to respective groups for selective treatment.

20 Claims, 7 Drawing Sheets

300

| ROSTER (PARTIAL) OF CONFERENCE CALL PARTICIPANTS (DISTRIBUTED) | | | |
|---|---|---|---|
| PARTICIPANT ID | INDICIA # 2 | INDICIA # 3 | INDICIA # 4 |
| ROBERT SMITH | EMAIL | PHOTOGRAPH | TELEPHONE NUMBER |
| WILLIAM JONES | EMAIL | PHOTOGRAPH | TELEPHONE NUMBER |
| ALAN THOMAS | EMAIL | PHOTOGRAPH | TELEPHONE NUMBER |
| JOHN ROBERTS | EMAIL | PHOTOGRAPH | N/A |
| VIC TALBOTT | EMAIL | N/A | TELEPHONE NUMBER |
| MIKE CIESLA | EMAIL | PHOTOGRAPH | N/A |
| MATT JOHNSON | EMAIL | N/A | TELEPHONE NUMBER |
| STEVE OH | EMAIL | PHOTOGRAPH | N/A |
| DOMENICK VO | EMAIL | PHOTOGRAPH | N/A |
| PATEL PARISH | EMAIL | PHOTOGRAPH | TELEPHONE NUMBER |
| CHRIS WONG | EMAIL | PHOTOGRAPH | TELEPHONE NUMBER |
| PETER CHOU | EMAIL | PHOTOGRAPH | N/A |
| BILL MICHAL | EMAIL | PHOTOGRAPH | N/A |
| TOM TAYLOR | EMAIL | N/A | TELEPHONE NUMBER |
| PARTICIPANT M | EMAIL | N/A | TELEPHONE NUMBER |

FIG 3A

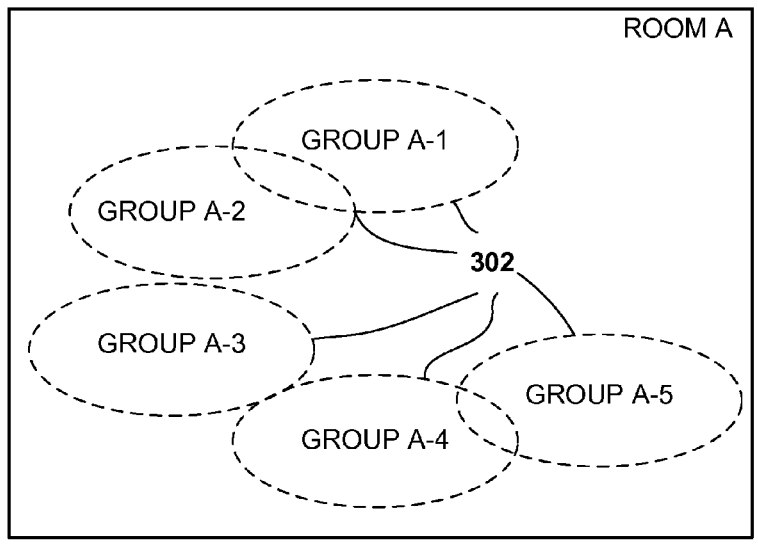

FIG 3B

| ROSTER (PARTIAL) OF CONFERENCE CALL PARTICIPANTS (ITERATION 1) | | |
|---|---|---|
| PARTICIPANT | GROUP No. | DEVICE COMPONENTS |
| ROBERT SMITH | A-1 | SPKR/MIC/VIDEO CAMERA/DISPLAY |
| WILLIAM JONES | A-1 | N/A |
| ALAN THOMAS | A-1 | N/A |
| JOHN ROBERTS | A-2 | SPKR/MIC/VIDEO CAMERA/DISPLAY |
| VIC TALBOTT | A-3 | N/A |
| MIKE CIESLA | A-3 | SPKR/MIC/VIDEO CAMERA/DISPLAY |
| MATT JOHNSON | A-3 | N/A |
| STEVE OH | A-4 | N/A |
| DOMENICK VO | A-4 | SPKR/MIC/VIDEO CAMERA/DISPLAY |
| PATEL PARISH | A-5 | SPKR/MIC/VIDEO CAMERA/DISPLAY |
| CHRIS WONG | A-5 | |
| PETER CHOU | A-5 | SPKR/MIC/VIDEO CAMERA/DISPLAY |
| BILL MICHAL | A-5 | N/A |
| TOM TAYLOR | A-4 | N/A |
| PARTICIPANT $M$ | D-5 | N/A |

FIG 3C

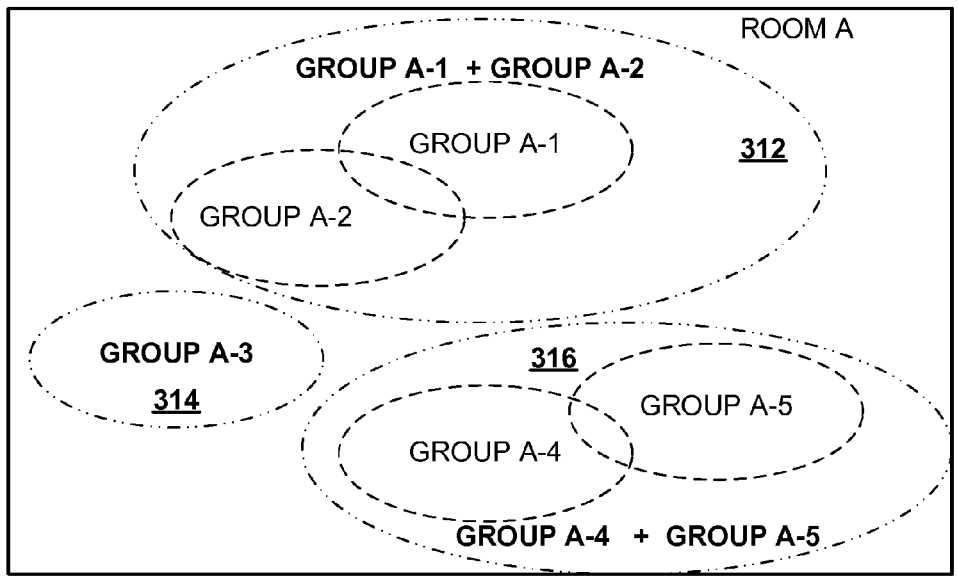

FIG 3D

SYSTEMS AND METHODS FOR USING EQUIVALENCE CLASSES TO IDENTIFY AND MANAGE PARTICIPANTS AND RESOURCES IN A CONFERENCE ROOM

BACKGROUND OF THE INVENTION

1. Field of the Invention

Embodiments generally relate to the initiation and conduct of communication sessions involving distributed groups of one or more participants and, more particularly, to systems and methods for identifying and managing participants and/or the devices usable by the participants during such sessions.

2. Description of the Related Art

Persons today are no longer required to meet in a conference room to use a fixed piece of communication equipment such, for example, as a speaker phone or adjunct device, in order to participate in a multiple party communication session which involves one or more remote groups of other participants. For example, such persons can now participate from any location using a personal device such, for example, as a mobile terminal (e.g., a laptop, notebook, or tablet computer, a smart phone). Some of these persons may gather in a location selected ad-hoc, and in others, they may bring their personal devices with them to a traditional conference room.

The inventors herein describe embodiments by which the participants congregating a particular location are identified, so that the resources available to the group at that location, are identified and can be managed efficiently and effectively.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for using equivalence classes to identify and manage participants and resources in one or more rooms in which participants in a conference call are situated is described. According to an embodiment, a computer implemented method comprises distributing, for display to display screens of mobile terminal devices respectively associated with the conference call participants, a roster including at least one indicium by which possession of an attribute, by at least one conference call participant can be confirmed by at least one other conference call participant using one of the respective mobile terminal devices. At a server, the method receives an indication from a mobile terminal device associated with call participants, that a conference call participant shares an attribute within at least one other conference call participant. The method further comprises assigning at least some of the conference call participants to at least one group for treatment on the basis of possessing an attribute at least one of identified or confirmed in a received indication. Based on the group assignments, the method initiates control of components of one or more communication devices associated with conference call participants. Non-limiting examples of attributes two or more participants may have in common so as to define their membership in a group include co-location in the same room from which they are to join or are participating in a conference call, belonging to the same department, membership in the same organization, serving or responsibility for supporting the same customer, etc.

In another embodiment, a system using equivalence classes to identify and manage participants in a conference room is described. The system includes a communication management server for hosting a conference call attended by groups of users in a plurality of conference rooms, the server having one or more processors, a memory and at least one network interface, and further comprising a conference call application comprising instructions stored and retained in the memory and executable by the processor. The conference call application is configured when executed to distribute, for display to display screens of mobile terminal devices respectively associated with the conference call participants, a roster including at least one indicium by which possession of an attribute, by at least one conference call participant can be confirmed by at least one other conference call participant using one of the respective mobile terminal devices; receive and process indications from respective mobile terminal devices, each associated with a corresponding call participant, that one or more other conference call participants share a pre-defined attribute; assign at least some of the conference call participants to at least one group for treatment on the basis of possessing an attribute identified or confirmed in received indications; and; and based on assignments of conference call participants to groups, initiate control of components of one or more communication devices associated with conference call participants.

In a further embodiment, a non-transitory computer readable medium for storing computer instructions that, when executed by at least one processor causes the at least one processor to perform the method for identifying and managing groups of conference call participants and resources in conference rooms.

BRIEF DESCRIPTION OF THE DRAWINGS

FIG. 3A a tabular representation depicting a partial roster of conference call participants distributed, in accordance with one or more embodiments, in anticipation of, or as part of the process of scheduling, a conference call.

FIG. 3B is a simplified illustration depicting the identification of several discrete groups of conference call participants within a common conference room, the groups being derived, as a first iteration, from the distributed roster through equivalence class analysis of attendance data furnished by operation of mobile terminals carried into the conference room by some of the participants according to one or more embodiments.

FIG. 3C is a tabular representation depicting the groups identified during the first iteration according to one or more embodiments.

FIG. 3D is simplified illustration depicting the groups identified during the first iteration, as part of a second iteration using equivalence class analysis in accordance with some embodiments.

Figure 1:
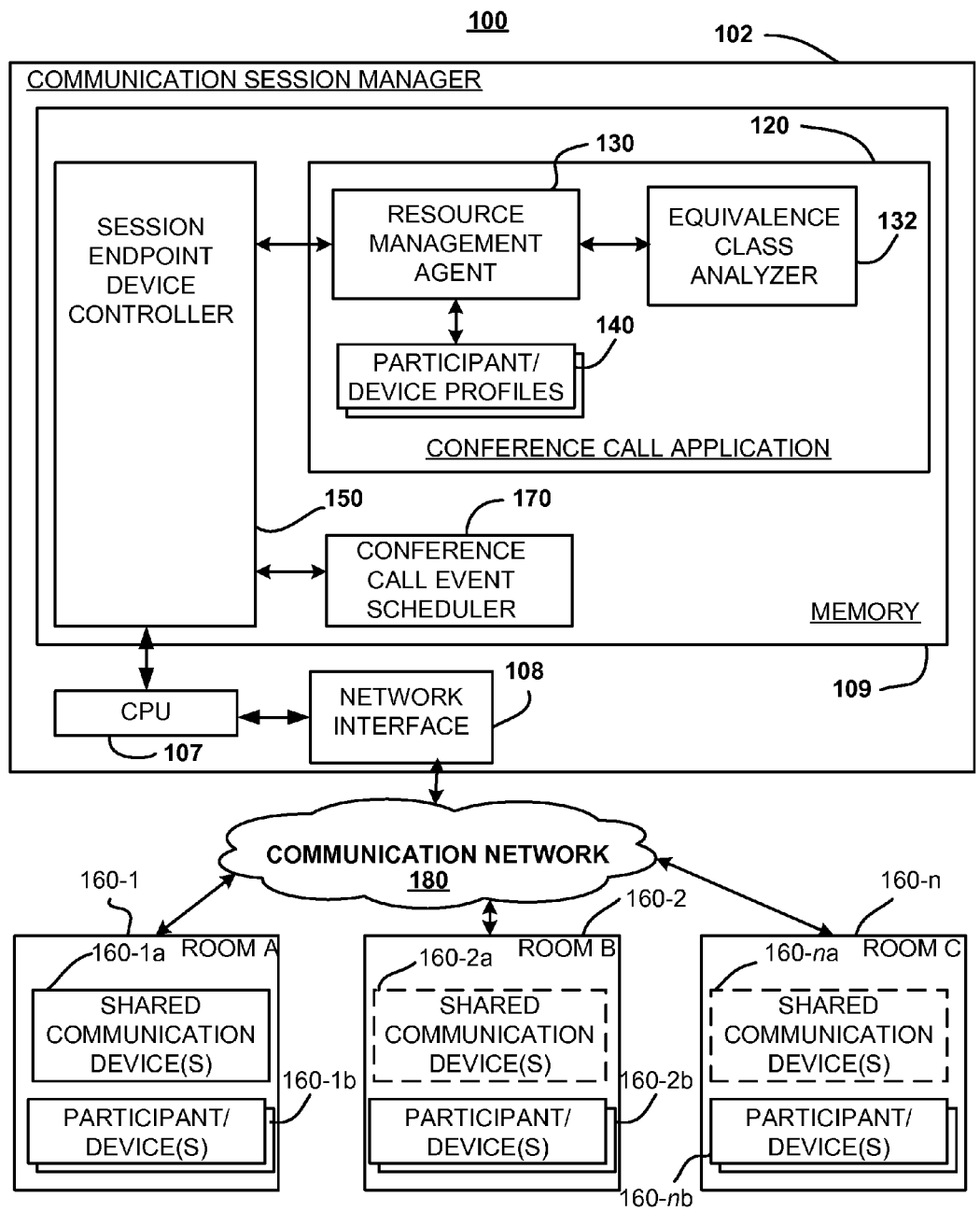
FIG. 1 is a block diagram depicting a communication system configured to use equivalence classes to identify and manage participants and resources in one or more rooms in which participants in a conference call are situated, according to one or more embodiments.

While the method and apparatus is described herein by way of example for several embodiments and illustrative drawings, those skilled in the art will recognize that the method and apparatus for using equivalence classes to identify and manage participants in a conference room is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for using equivalence classes to identify and manage participants in a conference room. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and techniques for using equivalence classes to identify and manage participants in a conference room are described. According to one or more embodiments, semantic information about participants joining a conference call from the same room is acquired by active application of the principle of equivalence classes.

As used herein, a "conference call" is intended to refer to any communication session involving two or more groups of participants, wherein each group is remotely located to the location of the other group(s). As such, a conference call can include an audio only call using speakerphones, adjunct devices or individual phones, as well as video conferences and online (web) conferences utilizing audio and video and/or desktop or document sharing. "Conference call participants", as used herein, include the host and those individuals who have joined a conference call either as an essential participant or as an "optional" attendee. In some embodiments, conference call participants also include one or more "secondary attendees" (i.e., those persons to whom an invitation has been forwarded by one of the other attendees). In some embodiments, conference call participants further includes not just those who have actually joined a conference call, but also those to whom an invitation to join has been extended by a host or meeting organizer.

A "roster", as used herein, is a listing or tabular representation that includes information about the conference call participants. A roster can include any of the following: the first and last name of the conference call participants, an e-mail address of the conference call participants, a facial image of each of the conference call participants, a telephone number for each of the conference call participants, and/or any information that uniquely identifies a conference call participant to other persons and is sufficient for at least one other person acquainted with the conference call participant to make a positive identification "on sight".

According to embodiments, equivalence classes are used to analyze and aggregate groups of conference call participants who share at least one attribute. In some embodiments, the shared attribute(s) are selected for efficient utilization and/or management of conferencing equipment in dedicated meeting areas as well as components of devices brought into dedicated or impromptu meeting areas by the conference call participants themselves. Examples of such attributes include shared meeting room locations, access to certain equipment, and possession of certain classes of devices having certain components.

In some embodiments, one or more of the attributes are identified by a conference call host or meeting organizer. Examples of such attributes that might be selected by the organizer either at the beginning of the conference call or at any point thereafter, include the organization or department to which a conference participant belongs, or the role of the participants in their organization(s), and the accounts or customers to which they are assigned. Such knowledge can be used for example, for statistical data gathering purposes, in the conduct and subsequent analysis of surveys, and to identify needs for meeting follow-up or broader participation in an organization or department.

In some embodiments, equivalence classes are used to determine how groups of conference call participants are distributed among remotely situated conference rooms, and/or to identify resources available for use by meeting participants in the course of a conference call. The number of participants assigned to any given group and/or room may range from one to n, where n is an integer equal to or great greater than one. In an embodiment, a roster of conference call participants is distributed for display to the participants. In some cases, the roster is rendered to the displays of mobile communication devices (also identified herein as "mobile terminal devices") brought, carried, or associated with the respective participants. In other cases, the roster can be rendered to a video conference display, shared desktop, or projection screen associated with a particular conference room from which one or more participants has joined a conference.

In embodiments, the roster contains at least one indicium, for each respective invitee or participant, by which the presence of the respective participant(s) in a room with one or more other participant(s), the access of the respective participant(s) to one or more resource(s) in common with one or more other participant(s), and/or the possession by the respective participant(s) of any other attribute in common with one or more other participant(s) can be confirmed by at least one other conference call participant using a communication device.

An example in which an attribute in common between two or more participants is presence in the same room is illustrative. After entering a room, at least some of the conference call participants use their communication device to access the roster and identify, to a server, both the room and at least one other person in the same room. The server assigns the participants to respective groups for treatment based on their possession of such common attributes as access to and/or possession of one or more shared multimedia component(s) associated with one or more communication device(s) present in the same room. As a further example, one participant participating from a first location in a building may confirm not only his or her own possession of a smart phone equipped with a microphone, GPS, and/or video camera, but also possession by one or more other persons at the first location.

Even where a participant cannot see any other participant(s) in a conference call, he or she can still facilitate the application of equivalence class analysis in accordance with some embodiments. That is, certain attributes shared by a subset of participants may be based on their assigned roles, departments, and/or customer responsibilities. Thus, for example, a member of an organization's sales department can utilize his mobile communication device to identify himself and one or more other participants in an online meeting as members of that organization, while a member of that same organization's finance department can utilize her mobile communication device to identify herself and several other online participants as belonging to that department. In an embodiment, at certain points during a conference call or online meeting, certain queries (e.g. as part of a survey) originating at the server may be directed to all of the participants, the responses collected at the server, and then, at some later point in the meeting (or thereafter), the responses tabulated, analyzed and reported to the participants (or to a meeting organizer or other party or parties). By proper application of equivalence class analysis, the need to ask each individual survey respondent to report certain information already collected from one or more other users is entirely or substantially avoided. To the extent that role, department, customer assignment and/or other attributes about a given participant has not already been confirmed by at least one other participant who shares that attribute (or by a participant who is otherwise in a position to make such confirmation through acquaintance with the participant), the missing information can be acquired by directing the query only to that participant.

Once each group has been defined based on the possession of one or more identified attributes and one or more persons, those groups having at least one person in common are merged through equivalence class analysis. In an embodiment, the merging of groups is performed iteratively, with new groups being added to and/or merged with previous ones as the number of participants sharing one or more attributes of interest is reported to the server. Considering the attribute of "sharing a conference room" for example, an updated roster, associating each respective group of participants joining a conference call or online meeting from a speakerphone or adjunct in a corresponding conference room, is obtained. The roster so updated can assign each participant to a plurality of groups on the basis of any attribute, or related set of attributes, of interest or potential interest to a meeting organizer. In some embodiments, the meeting organizer is prompted to select one or more attributes of interest to be used in establishing the group(s).

Grouping based on shared attributes, based on the application of equivalence classes according to embodiments, facilitates the delivery of such value-added services as broadcasting to a group in the room, using smart phone cameras and microphones as media handling, conference room adjuncts, and adaptive user interfaces where duplicate media is suspended by default for users on smart phones in the conference room.

Typically, persons in a conference room setting perceive any media content through devices already in the room (e.g., a speakerphone or speaker adjunct and a media projector. However, some of the persons in the room may additionally join the conference with a mobile terminal device they have brought into the room such, for example, as a smart phone, tablet computer, or notebook computer. Such "bring your own" devices or BYODs can be used to participate in such conference-related activities as providing comments or asking questions by instant messaging text exchanges, or viewing a roster. The inventors herein have recognized, however, that conventional conferencing systems are configured to treat each participant, whether joining from a conference room or not, as an individual joining the conference. As a consequence, an opportunity to collect semantic information about conference call participants joining as a group from the same conference room is often wasted. While biometric techniques like voice print identification, facial recognition, and the like have been proposed to identify participants at a shared conference endpoint, these techniques are complex and error-prone. Hardware solutions, which have also be proposed for identification of conference participants, require investment in and deployment of specialized equipment Even 802.11x wireless or near field communication based interrogation schemes are cumbersome due to either signal leakage issues in the first case, and the need for proximity to the interrogating device, in the second.

Various embodiments of a method and apparatus for using equivalence classes to identify and manage participants in a conference room are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

FIG. 1 depicts a communication system 100 configured to apply equivalence class analysis to identified groups of conference call participants sharing one or more common attributes. This facilitates efficient management of conference calls, and identification of communication resources available to the participants within each group such, for example, as those provided by communication devices already in a room or carried into a room by the participants. Such analysis also supports various data gathering and reporting activities using, for example, data gathered about the conference call participants from a subset of those participants. The system 100 generally includes a communication session management server 102 and a plurality of communication devices or endpoints 160. For example, a first communication device 160-1a can be provisioned as a shared resource located within a meeting room as room A, which is dedicated to meetings and conference calls. Additional devices such, for example as smart phones, tablet computers, and notebook computers, as may be carried by conference call participants into room A, are indicated generally at 160-1b. In accordance with one or more embodiments, some of the components associated with the additional devices can be operated for the benefit of one or more of the participants in the conference call. The operation of other components associated with the additional devices can also be suspended, as being redundant and/or deleterious to the user experience of the participants. Second and nth communication devices 160-2 and 160-n are similarly configured in rooms B and C, respectively, and may or may not include pre-positioned communication device resources as devices 160-2a and 160-na in addition to the devices 160-2b and 160-nb which the participants carry with them into those rooms in anticipation of joining a conference.

With continued reference to FIG. 1, it will be seen that communication session management server 102 includes a conference call application (or conference call application module) 120 that comprises a resource management agent 130, an equivalence class analyzer 132, and a data store containing participant and device profiles 140. The instructions comprising conference call application 120 are stored in memory 109 and are executable by one or more processors as CPU 107. Also stored within memory 109 are a conference call event scheduler 170 and a session endpoint device controller 150 configured to operate and/or suspend operation of one or more components of the shared communication devices and participant devices during a conference call.

A network interface 108 of communication management server 102 establishes communication links between one or more of the shared communication devices and participant devices, as devices 160-1, 160-2 and 160n, via communication network 180. Some or all of the communication devices 160 can be associated with one or more conference call participants and can therefore operate as a shared communication device.

Figure 2:
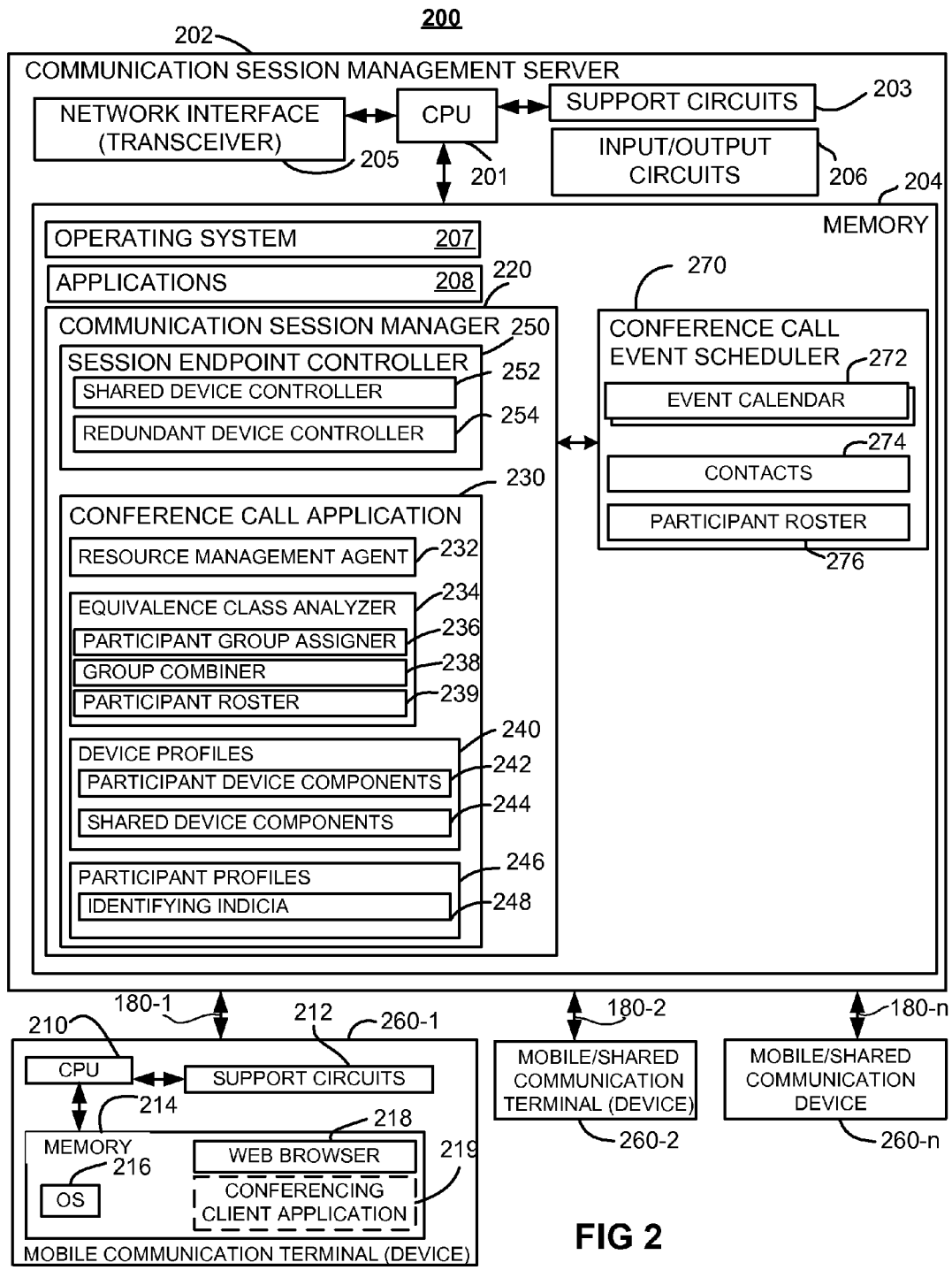
FIG. 2 is a block diagram depicting, in greater detail, the interaction between the functional components according to the embodiment exemplified by FIG. 1, in accordance with some embodiments.

FIG. 2 is a block diagram depicting, in greater detail, the interaction between the functional components of a communication system 200 constructed in accordance with some embodiments. The various components of system 200, including communication session management server 202, conference call/event scheduling server 270, and user communication terminals 260-1 to 260-n are connected by one or more network links indicated generally at 180-1, 180-2 and 180-n, respectively. Some of the links are established by a network which includes a communication system that connects computers (or devices) by wire, cable, fiber optic and/or wireless link facilitated by various types of well-known network elements, such as hubs, switches, routers, and the like. The network interconnecting some components may also be part of the Intranet using various communications infrastructure, such as Ethernet, Wi-Fi, a personal area network (PAN), a wireless PAN, Bluetooth, Near field communication, and the like.

The various servers, including servers 202 and 270, are each a computing device, or may be the same computing device as, for example, a desktop computer, laptop, tablet computer, and the like, or they may be cloud based servers e.g., a blade server, virtual machine, and the like. In an embodiment, a provisioned conferencing system user or subscriber utilizes an event calendar interface 272 of conference call event scheduler 270 to schedule a conference call event. As participants are invited, which invitation process may be aided by reference to a contacts server or database 274, they are added to a participant roster 276. According to some embodiments, a roster is distributed to the invited participants well in advance of a scheduled conference call event. In an embodiment, those participants who bring theft own mobile terminal device to a room where they will be joined by other participants are prompted to display the roster on a user interface invoked by a conferencing client application 219 or web browser 218 executed by processor 210 of user terminals 260-1 to 260-n. In some embodiments, the participants are prompted to use the interface to identify any participants they recognize as being in the same room. In addition, or as an alternative, the participants may be prompted to use the interface to identify their own organization, department, role and/or customer focus, as well as the identity of any other participants assigned to the same organization, department, role and/or customer. In an embodiment, some of the data gathered is stored in a database for the current as well as subsequence conference calls involving one or more of the same participant(s).

The identification of participants and/or shared attributes may be based entirely on a participant's prior knowledge of the other participants they identify, in which case the roster of participants may supply a listing of names as the sole indicium by which participant identities and shared attributes such, for example, as presence at the same location can be confirmed by one or more other participant(s). In some cases, as where several participants identify a telephone number of a conference room phone as their audio endpoint, they are automatically assigned to the same group. As a further example, the indicium distributed as part of or in addition to the roster can include a photograph or other image of at least some of the participants. In such cases, a conference participant invoking the user interface via his or her mobile terminal device can confirm the existence of one or more shared attributes such, for example, presence of other participants in the same room merely by reference to the image(s) so that they don't require prior knowledge of or acquaintance with the identified participant(s). In yet another embodiment, the system automatically analyzes groups to find common participants and merge those groups having common participants. For example, if smart phone user A identifies User)(as being in the same room, being a member of the same organization, and/or being in the same department, and smart phone user B identifies user X as being in the same room and being in the same organization (but not of the same department), the users A and B are merged into a single group for the "meeting room location" attribute based on the principle of equivalence classes, but these users remain in different groups when it comes to the "department" attribute. In still another embodiment, at least some of the smart phone users are prompted to click images of people around them and the system analyzes these images wherein faces captured in images acquired by smart phones operated by user A and user B are identified through image analysis and this overlap supplies sufficient equivalence class data to justify merger of the groups to which users A and user B belong.

Using attribute data gathered from conference call participants, server 202 is configured to perform equivalence class analysis in order to identify, for example, the users at each room location where one or more conference call participants is/are situated and in order to manage the resources such, for example, as communication devices and components thereof, at each location during a conference call. Server 202 is further configured to perform equivalence class analysis in order to aggregate the same participants on the basis of one or more other attributes such, for example, as the organization to which they belong, the departments for which they work, or the customers to whom they are assigned. In the embodiment depicted in FIG. 2, the server 202 includes a Central Processing Unit (CPU) 201, support circuits 203, input/output circuits 206, network interface (transceiver) 205, and a memory 204. The CPU 201 may include one or more commercially available microprocessors or microcontrollers that facilitate data processing and storage. The various support circuits 203 facilitate the operation of the CPU 201 and include one or more clock circuits, power supplies, cache, and the like. The memory 204 includes at least one of Read Only Memory (ROM), Random Access Memory (RAM), disk drive storage, optical storage, removable storage and/or the like.

The memory 204 includes an operating system 207, and applications 208. The operating system 207 may include various commercially known operating systems. Among the applications 208 stored in memory 204 is conference call application 230, which includes a resource management agent 232, an equivalence class analyzer 234, communication device profiles 240, and conference participant profiles 246. In an embodiment, resource management agent 232 identifies the resource requirements of a conference call, at each location where participants are present, tracks the availability of resources at each location using information provided by equivalence class analyzer 234. In some embodiments, resource management agent 232 supplies, to session endpoint controller 250, state information relating to each resource (communication device component) available at the locations where conference call participants are located.

Each of devices 260-1 to 260-n is a potential contributor of resources. For example, a host of a conference call may identify a need to present a video during a conference call. Some rooms dedicated to the conduct of meetings and conference calls, may already have a video terminal or media projector and screen. However, other rooms where conference call participants are located may lack such multimedia handling capabilities. In an embodiment, session endpoint controller 250 includes a shared device controller 252 which utilizes state information supplied by resource management agent 232 to selectively operate the display, speaker and microphone components of at least one mobile communication terminal at one or more of the locations where conference call participants are situated. Similarly, redundant device controller 254 is configured to selectively suspend operation of the speaker, microphone and/or display components of at least one redundant mobile communication terminal at one or more locations where conference call participants are situated.

To this end, device profiles 240 comprise participant device component profiles 242 which are associated with those mobile communication devices that have transmitted signals to server 102 and have identified a listing of their components and an intention of its operator to join a conference at a particular location and to use the device to communicate during the conference call. The device profiles 240 can also include shared device components 244 which correspond to those communication devices which are associated with a fixed conferencing location (e.g. a meeting or conference room.

The manner in which conference call participants are associated with a particular room in accordance with embodiments will be described with continued reference to FIG. 2, as well as by reference to FIGS. 3A-3F. In FIG. 2, it will be seen that equivalence class analyzer 234 includes a participant group assigner 236, a group combiner 238 and a participant roster 239. Participant profiles 246 can include identifying indicia 248 extracted from conference call event scheduler 270. As noted previously, in some embodiments a meeting host or conference call organizer can be prompted to select and or create one or more attributes forming the basis of grouping by equivalence classes. For example, during a meeting setup stage prior to or subsequent to scheduling a conference call, the host may decide to gather data for a survey in which segmentation analysis according to department and function is contemplated. In such a case, group assigner 236 is configured to identify the following groups by attribute:

_Group_location_ID
   {group location_ID_A}
   {group location ID_B}
   {group location_ID_C}
Group_organization_ID
   group_organization_A_Division_1
   {group_organization_A_Division_1_Subgroup_Sales}
   {group_organization_A_Division_1_Subgroup_Operations}
   {group_organization_A_Division_1_Subgroup_Finance}
   {group_organization_A_Division_1_Subgroup_Legal}
   {group_organization_A_Division_1_Subgroup_Procurement}
   group_organization_A_Division_2
   {group_organization_A_Division_2_Subgroup_Sales}
   {group_organization_A_Division_2_Subgroup_Operations}
   {group_organization_A_Division_2_Subgroup_Finance}
   {group_organization_A_Division_2_Subgroup_Legal}
   {group_organization_A_Division_2_Subgroup_Procurement}

FIG. 3A a tabular representation depicting a partial roster 300 of conference call participants distributed, in accordance with one or more embodiments, in anticipation of, or as part of the process of scheduling, a conference call. FIG. 3B is a simplified illustration depicting the identification of several discrete groups of conference call participants, the groups being derived, as a first iteration, from the distributed roster through equivalence class analysis of attribute data furnished, at least in part, by operation of mobile terminals carried into the conference room by some of the participants according to one or more embodiments. In modified embodiments, at least some of the attribute data is fetched from a database containing previously collected data. FIG. 3C is a tabular representation depicting the groups shown in FIG. 3B and identified during the first iteration according to one or more embodiments.

FIG. 3D is simplified illustration depicting the groups identified during the first iteration, as part of a second iteration using equivalence class analysis in accordance with some embodiments. As noted previously, there are a variety of scenarios in which equivalence class analysis supports merging two or more of groups such as groups A-1 and A-2 or groups A-4 and A-5. For example, if participant Robert Smith (group A-1) identifies participant John Roberts (group A-2) as being in the same conference room (i.e., Room A), then immediate merger of groups A-1 and A-2 is appropriate. Likewise, if participant Steve Oh (group A-4) takes a picture of participants Peter Chou and Bill Michal (both, group A-5), if participant Patel Parish (group A-5) takes a picture of Dominick Vo, Tom Taylor and Steve Oh (group A-4), then image analysis performed on the acquired images would inform the equivalence class analyzer 232 that groups A-4 and A-5 have at least one member in common and should be merged.

Figure 3E:
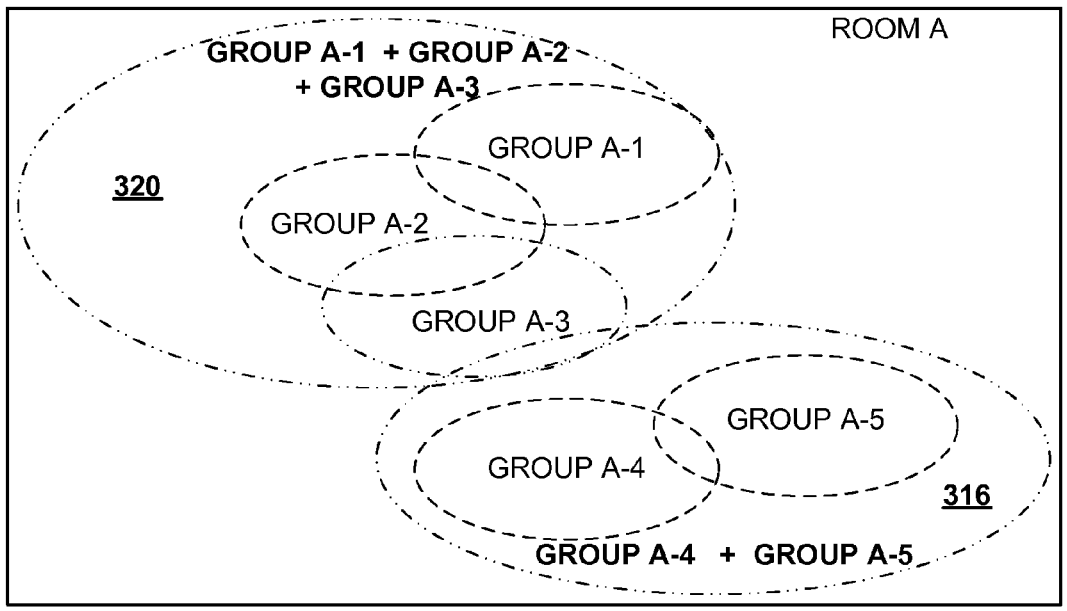
FIG. 3E is simplified illustration depicting a further consolidation of at least some of the groups identified during the first iteration, as part of a third iteration using equivalence analysis in accordance with some embodiments.
Figure 3F:
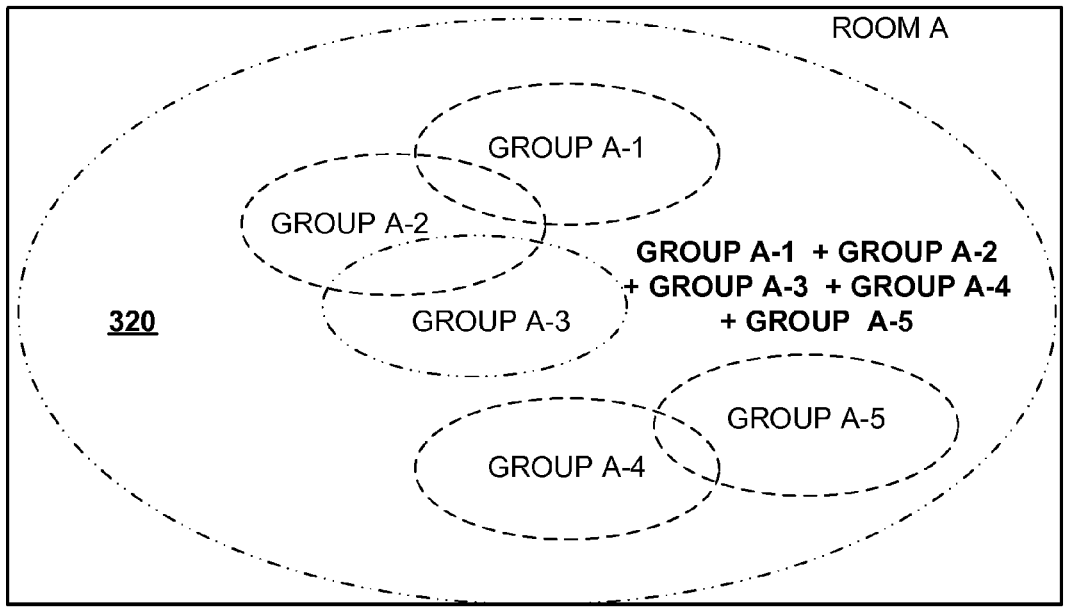
FIG. 3F is simplified illustration depicting a further consolidation of at least some of the groups identified during the first iteration, as part of a final iteration using equivalence analysis in accordance with some embodiments.

FIG. 3E is simplified illustration depicting a further consolidation of at least some of the groups identified during the first iteration, as part of a third iteration using equivalence analysis in accordance with some embodiments, while FIG. 3F is simplified illustration depicting a further consolidation of at least some of the groups identified during the first iteration, as part of a final iteration using equivalence analysis in accordance with some embodiments. It will be readily ascertained by the artisan of ordinary skill that fewer or more iterations may be required, and that a fewer or a greater number of a participants at any one location may actually elect to bring a mobile communication terminal with them into a conference room. It suffices to say that by appropriate utilization of the principle of equivalence classes, groups can be merged together so that the communication devices distributed amongst the participants belonging to any one of those groups, in any given location, can be utilized in a manner which is both efficient and calculated to enhance the collective experience of all participants in a conference call. Moreover, participants possessing any pre-identified attribute (or sets of attributes) can be organized into one or more groups through equivalence class analysis to facilitate disparate treatment by group, as well as customized data gathering processes and/or segmentation analysis.

Figure 4:
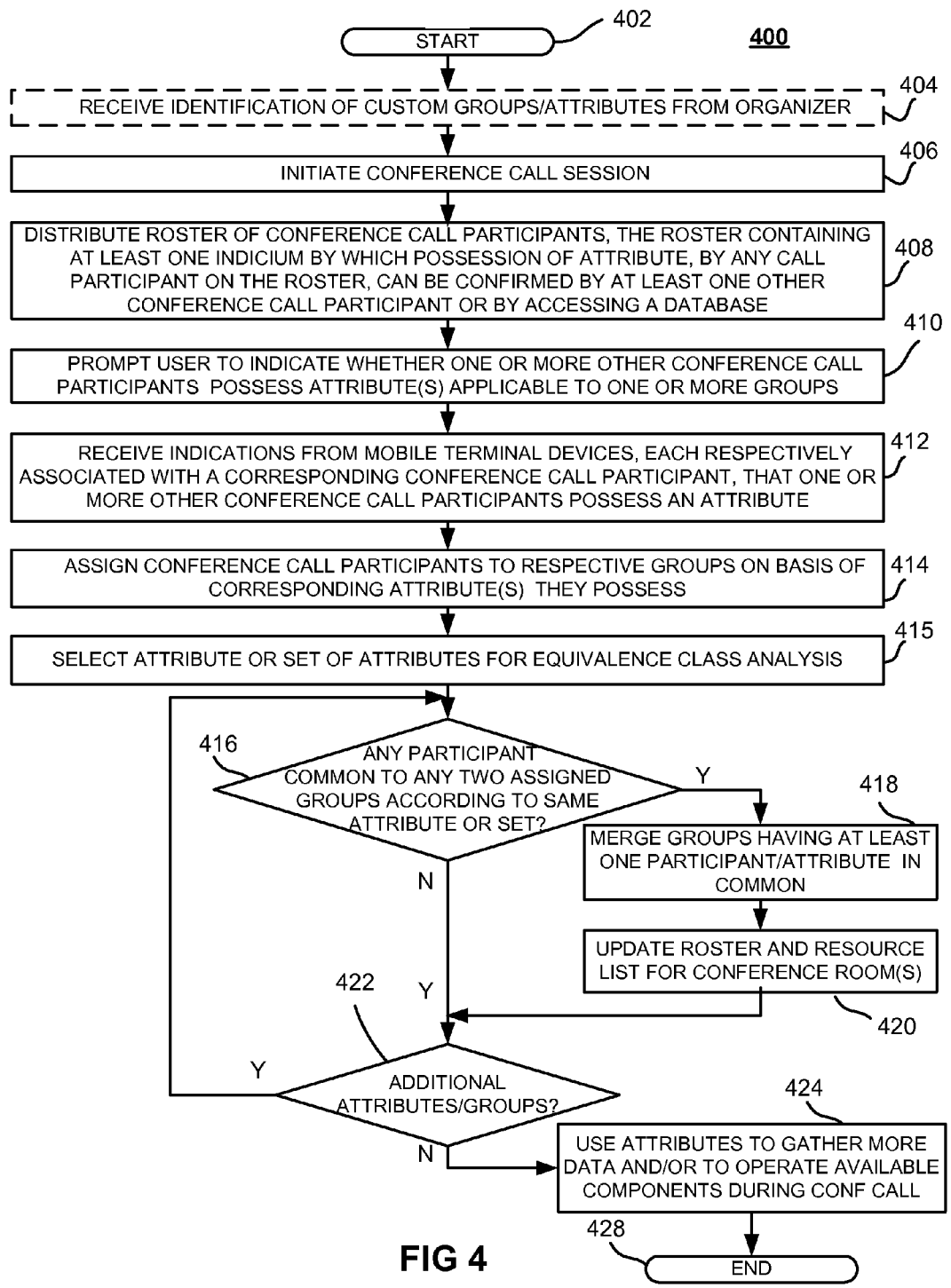
FIG. 4 is a flow diagram depicting a process for using equivalence classes to identify and manage participants and resources in one or more rooms in which participants in a conference call are situated, according to one or more embodiments.

FIG. 4 is a flow diagram depicting a method 400 for using equivalence classes to identify and manage treatment of participants and/or utilization of resources during a conference call, according to one or more embodiments. The participants may, for example, be distributed at a number of different locations, wherein some of these locations are rooms having dedicated conferencing equipment (e.g., speaker phones and adjuncts, projectors, projection screens, video cameras, and the like) while others of the locations rely upon an ad hoc utilization of an a device in a participant's office, home, car or other location. Each location includes a group of participants numbering anywhere from one to many.

The method 400 is entered at step 402 and proceeds to step 404. At step 404, the method 400 optionally receives from a meeting organizer or host an identification of one or more groups and the attribute(s) in common between conference call participants which form(s) the basis of each individual conference call participant's assignment to one or more of the groups. By way of illustrative example, the organizer can choose to define groups according to role, customer assignment, organization or department. As noted previously, defining such groups facilitates specialized handing for some participants as compared to others, which can be useful when gathering additional information from the participants via surveys delivered to the participants via a ubiquitous protocol such as SMS text messaging or the like via operation of their respective mobile terminals. If no such groups and/or attributors are specified by the user, then equivalence class analysis according to embodiments can at least be performed on the basis of such potentially shared attributes as the room locations from which the participants have joined a conference or the communication devices and components thereof to which those participants have access during a conference call.

From step 404, the method proceeds to step 406, at which point the organizer initiates a conference call session wherein voice and/or video and/or desktop sharing and/or document sharing is facilitated among the participants. The process then proceeds to step 408.

At step 408, a roster is distributed which identifies one or more conference call participants (or invitees, if the roster is an "initial" roster that includes not only those who have actually joined a conference but also those to whom an invitation has been extended). The roster contains at least one indicium by which the possession of one or more attributes, by any call participant on the roster, can be confirmed by at least one other conference call participant. Examples of indicia include the names of the participants, their email addresses, their telephone numbers, a facial image, or an audio recording of their voice. In some embodiments, data relating to a participant's possession of an attribute is alternatively accessible from a database. The method proceeds to step 410.

Figure 5:
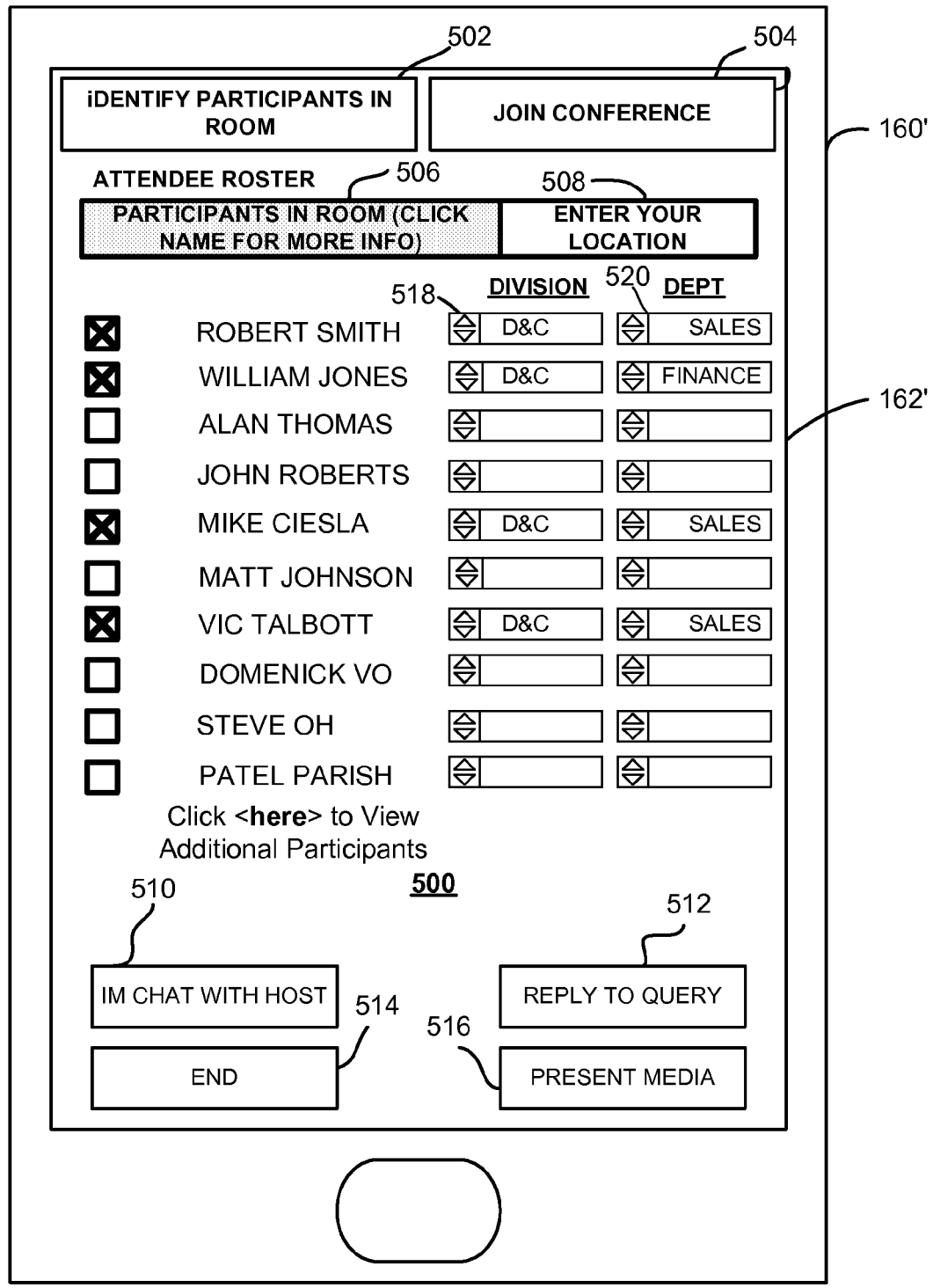
FIG. 5 is a screen view of user interface rendered to the display of a conference call participant to facilitate gathering of participant attendance data for use in performing equivalence class analysis according to one or more embodiments.

At step 410, the method 400 provides, for rendering to the display of communication devices carried by, or otherwise associated with at least some of the participants, a prompt to the user soliciting an indication of whether one or more participants on the roster possess attribute(s). In an embodiment, the prompt comprises a menu configured for rendering to the display of a display phone, a mobile communications device such as a smart phone, PDA, or a tablet computer with microphone, headphones and camera adjuncts, or a desktop, laptop or notebook computer. An exemplary menu 500 rendered to the display 162' of a communication device 160' is shown in FIG. 5, which will be discussed in greater detail shortly.

In any event, and returning to FIG. 4, the method 400 proceeds from step 410 to step 412. At step 412, the method receives respective indications from corresponding communication devices. In some embodiments, some or all of the communication devices from which the indications are received are mobile terminal devices carried by conference call participants into the rooms where they will participate in a conference call. Some or all of the participants, however, may have no access to dedicated conferencing facilities and may join the conference as individuals from their respective offices. In such cases, the communication devices from which the indication are received may be their desktop or laptop computers, a soft phone client executing on such computers, or a speakerphone with a color display or video screen. It suffices to say that the participants have substantial latitude in the manner by which they participate and provide attribute data for equivalence class analysis according to embodiments of the present disclosure.

At step 412, the method receives indications from one or more conference call participants that one or more other conference call participants possess a particular attribute or sets of attributes. A first participant in a conference room, for example, may indicate that a second participant possesses the attribute of participating in the conference call from the same location as the first participant. As exemplified by FIG. 5, however, the first participant may also identify other attributes in common among one or more other participants (i.e., other than himself or herself). In FIG. 5, fields 518 and 520 provided as part of menu 500 enable a user of mobile terminal 160' to identify "Division" and "Department" attributes, respectively. Once the one or more shared attributes are indicated responsive to the prompt at step 412, the method then proceeds to step 414.

At step 414, the conference call participants are assigned to one or more groups on the basis of the attribute data collected from the subset of conference call participants who have responded and/or retrieved from a database containing previously collected or otherwise available attribute data. In some embodiments, if a participant identifies another participant as sharing attribute "X" with him or her, then the groups to which each of these participants respectively belong can be immediately combined. This would be the case, for example, when the merging of groups occurs after all available information relevant to the merging decision(s) has been gathered. On the other hand, there may be situations wherein the information comes in over time, as for example, during an initial "set up" phase when participants are still joining a conference or where groups are still being formed/finalized after a conference call has already commenced. In these latter two situations, considering attribute y, group 1 having {p1, p2, p3}, and group 2 having {p4, p5, p6}, when p4 says that p1 shares attribute x with him, we first add p1 to group 2, and then merge them because p1 is common between the two groups.

In some embodiments of a "multi-stage" or iterative process of merging groups, it is presumed that invitees may join a conference call at any point between 10 minutes ahead of the call starting point and 5 minutes after that starting point. A first participant, for example, may be identified as belonging to three distinct groups —the group containing participants located in Conference Room A, the group containing participants in an organization's "Distribution and Control" ("D & C") business unit, and the group containing participants in a business unit's "SALES" department.

From step 414, the method 400 advances to step 415, where the method selects a first attribute or set of attributes for equivalence class analysis according to an embodiment. From step 415, the method proceeds to determination step 416. If the method determines at step 416 that a participant is common to two or more groups on the basis of the same attribute or set of attributes, those groups are merged at step 418. By way of illustrative example, a participant assigned to a first group might share the attribute "in Room A of Building X" with a participant assigned to a second group. In this case, the method 400 determines that the first group and the second group are in the same room and, at a minimum, have access to any resources (e.g., speaker phone, video conferencing facilities, computer-connectable projector, etc, projector screen, etc) which are assigned to and/or available at that room.

From step 418, the method proceeds to step 420. At step 420, the roster is updated, and a resource list for each conference participant location is updated. In addition, or alternatively, a list of participants possessing the subject attribute or linked set of attributes is updated. With reference to FIG. 5, for example, a first table is defined which includes Robert Smith, William Jones, Mike Ciesla and Vic Talbott as possessing the common attribute of belonging to the same Division ("D & C"), while those same individuals less William Jones are included in a second table. These tables would likely include many other names, supplied by other participants via their own respective communication terminals to provide the requisite indications through application of the equivalence class grouping process associated with the merging operation of step 418.

From step 420, or if at determination step 416 it is determined that no participant has been assigned to more than one group on the basis of a single attribute or set of linked attributes, the method proceeds to determination step 422. At determination step 422, the method 400 determines whether equivalence class analysis remains to be performed for any other groups identified by one more attributes. If so, the method 400 returns to step 416 and steps 416-422 are repeated until no further groups remain for analysis. At this point the method 400 proceeds to step 424. At step 424, the associations of conference call participants to one or more groups are stored. In some embodiments, the conduct of the conference call and management of resources in connection with the call are managed according to the group assignments. Thus, for example, certain components of one or more devices carried into the same conference room by participants joining the conference from that room are selectively energized during one or more portions of the conference call, while at others, components of one or both of them are turned off (e.g., "silent mode'). At other times, those participants sharing the attribute of belonging to the sales organization may be selectively queried to respond to a single question poll, the results of which may be viewed via a shared desktop of the organizer or a meeting presenter. From step 424, the method 400 proceeds to step 428 and terminates.

FIG. 5 is a screen view of user interface rendered to the display of a conference call participant to facilitate gathering of participant attendance data for use in performing equivalence class analysis according to one or more embodiments. As seen in FIG. 5, a communication terminal 160' includes a display screen 162' upon which a user interface 500 is displayed following invocation of a web browser client or conferencing client application executable by a processor of the terminal 160' according to one or more embodiments. The user interface 500 includes soft buttons 502 and 504, respectively, prompting the device user to perform such functions as identifying other participants in the room and join the conference using the device, respectively. Other "soft" feature buttons supported by the browser client or client application include a button 510 for initiating an IM chat with the host, button 512 for responding to a query, button 516 for presenting media to the other group participants as part of the conference, and button 514 for terminating participation.

In the particular screen of the user interface 500 shown in FIG. 5, a first page of the conference call participant (or attendee) roster is shown because the user has opted to identify participants in the room by actuation or touching of soft feature button 502. Tab 506 is highlighted to show that the display corresponds to the list of participants. By clicking or hovering over any of the participant names shown, the user may retrieve additional indicia for purposes of identifying one or more of the participants listed. The user is asked to check the box of each person he or she can identify, including him- or herself. To toggle from the listing of attendees to a screen for entering the room number and/or an identifier of a phone or other communication device to be used by the user during the conference call, tab 508 is provided.

A variety of enhancements are available for extending the use of equivalence classes in accordance with embodiments described herein. For example, the communication management server 202 can be configured to store, in memory, past associations of conference participants to suggest who may be in the room. For example, if participants A, B, and C are usually in a group when an endpoint associated with a particular telephone number is being used for a conference call, this information can be verified to form a group by presenting a user with a pair of options such as "join conference on phone number T, users A, B, C" and "not today". Additionally, a mobile terminal device could send its geographical location to the communication management server and this information might be used by the server to suggest which users are nearby and potentially in the room to facilitate association with a group comprising some or all of those users.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for identifying and managing groups of conference call participants and resources in one or more rooms, comprising:
   distributing, for display to display screens of mobile terminal devices respectively associated with the conference call participants, a roster including at least one indicium by which possession of an attribute, by at least one conference call participant can be confirmed by at least one other conference call participant using one of the respective mobile terminal devices;
   at a server, receiving an indication from a mobile terminal device associated with call participants, that a conference call participant shares an attribute within at least one other conference call participant;
   assigning at least some of the conference call participants to at least one group for treatment on the basis of possessing an attribute at least one of identified or confirmed in a received indication; and
   based on group assignments, initiate control of components of one or more communication devices associated with conference call participants.

2. The method according to claim 1, further comprising merging one group of conference call participants and another group of conference call participants into a single merged group if there is at least one participant in each group possessing at least a first attribute.

3. The method according to claim 1, wherein the first attribute is co-location in a same conference room.

4. The method according to claim 1, wherein the first attribute is membership in a common organization or department of an organization.

5. The method according to claim 1, further including providing, for rendering to a display of communication devices associated with respective conference call participants, a prompt to provide indications of one or more other conference call participants possessing at least one attribute.

6. The method according to claim 1, further comprising instructing a component, of at least some mobile terminal devices carried into a conference room by participants belonging to a group, to operate or suspend operation during at least a portion of a conference call.

7. The method according to claim 3, further comprising:
receiving, in a memory of the server, a signal, from a first mobile terminal device associated with one of the conference call participants belonging to a merged group, wherein the signal is indicative of a request to join a conference call and wherein the signal is indicative of one or more multimedia components associated with the first mobile terminal device; and
associating, at the server, the one or more multimedia components with a merged group or room.

8. The method according to claim 2, further comprising:
receiving, in a memory of the server, a signal from a first mobile terminal device associated with one of the conference call participants of a first merged group or a second merged group and indicative of a request to communicate using one or more multimedia components associated with the first mobile terminal device; and
receiving multimedia content from the first mobile terminal device, wherein the multimedia content is generated using the at least one multimedia component indicated by the signal.

9. The method according to claim 1, further comprising:
receiving, in a memory of the server, a signal from a first mobile terminal device associated with one of the conference call participants of a first group of conference call participants or a second group of conference call participants and indicative of a request to communicate using one or more multimedia components associated with the first mobile terminal device; and
receiving multimedia content from the first mobile terminal device, wherein the multimedia content is generated using the at least one multimedia component indicated by the signal.

10. A communication system comprising:
a communication session management server for hosting a conference call between groups of users in a plurality of conference rooms, the server including
a memory,
a processor, and
a conference call application comprising instructions stored and retained in the memory and executable by the processor, wherein the conference call application is configured when executed to:
distribute, for display to display screens of mobile terminal devices respectively associated with the conference call participants, a roster including at least one indicium by which possession of an attribute, by at least one conference call participant can be confirmed by at least one other conference call participant using one of the respective mobile terminal devices;
receive and process indications from respective mobile terminal devices, each associated with a corresponding call participant, that one or more other conference call participants share a pre-defined attribute;
assign at least some of the conference call participants to at least one group for treatment on the basis of possessing an attribute identified or confirmed in received indications; and; and
based on assignments of conference call participants to groups, initiate control of components of one or more communication devices associated with conference call participants.

11. The system according to claim 10, wherein the conference call application is further configured, by execution of instructions by the processor to merge, into a single merged group, one group of conference call participants and another group of conference call participants if there is at least one conference call participant in each group possessing at least a first attribute.

12. The system according to claim 11, wherein the server further comprises
a transceiver, operatively associated with the memory and processor, configured to receive a signal, from a first mobile terminal device associated with one of the conference call participants,
wherein the signal is indicative of a request to join a conference call and is associated with an identification of one or more multimedia components associated with a first mobile terminal device associated with a conference call participant assigned to the merged group or with a shared communication device accessible to at least some participants within a room and assigned to the merged group; and
wherein the conference call application is further configured to associate the one or more multimedia components with at least one of a group or a room.

13. The method according to claim 11, further comprising:
a transceiver, operatively associated with the memory and processor, configured to receive a signal, from a first mobile terminal device associated with one of the conference call participants of the first group or second group,
wherein the signal is indicative of a request to communicate using one or more multimedia components associated with a first mobile terminal device associated with a conference call participant assigned to the merged group or with a shared communication device accessible to at least some participants within a room and assigned to the merged group; and
wherein the conference call application is further configured to cause at least one multimedia component, identified by a signal received by the transceiver, to present multimedia content generated for participants of a conference call.

14. The method according to claim 11, further comprising:
a transceiver, operatively associated with the memory and processor, configured to receive a signal, from a first mobile terminal device associated with one of the conference call participants of a first merged group of participants possessing a first common attribute or of a second merged group possessing a second common attribute,
wherein the signal is indicative of a request to communicate using one or more multimedia components associated with one of the first mobile terminal device or a shared communication device accessible to at least some participants in the first merged group or second merged group; and
wherein the conference call application is further configured to cause at least one multimedia component, identified by a received signal, to generate multimedia content originated by one or more participants belonging one or both of the first and second merged groups.

15. The system according to claim 14, wherein the conference call application is further configured to initiate altered or suspended operation by at least one component of at least some of the mobile terminal devices carried into a conference room by participants belonging to the first merged group but not those belonging to the second merged group.

16. The system according to claim 11, wherein the conference call application is further configured to at least one of cause operation or suspend operation by at least one component of at least some of the mobile terminal devices carried into a conference room by participants belonging to the merged group.

17. A non-transitory computer readable medium for storing computer instructions that, when executed by at least one processor causes the at least one processor to perform a method for identifying and managing groups of conference call participants and resources in one or more rooms, the method comprising:

distributing, for display to display screens of mobile terminal devices respectively associated with the conference call participants, a roster including at least one indicium by which possession of an attribute, by at least one conference call participant can be confirmed by at least one other conference call participant using one of the respective mobile terminal devices;

at a server, receiving an indication from a mobile terminal device associated with call participants, that a conference call participant shares an attribute within at least one other conference call participant;

assigning at least some of the conference call participants to at least one group for treatment on the basis of possessing an attribute at least one of identified or confirmed in a received indication; and based on group assignments, initiate control of components of one or more communication devices associated with conference call participants.

18. The computer readable medium of claim 17, wherein the method further comprises merging, into a single merged group, one group of conference call participants and another group of conference call participants if there is at least one conference call participant common to both groups.

19. The computer readable medium of claim 17, wherein the attribute common to at least two groups merged to form a single group is co-location in a same conference room.

20. The computer readable medium of claim 17, wherein the method further includes providing, for rendering to a display of communication devices associated with respective conference call participants, a prompt to provide indications of one or more other conference call participants possessing at least one attribute defining membership in a group.

* * * * *